United States Patent
Malkan et al.

(10) Patent No.: US 11,830,341 B2
(45) Date of Patent: Nov. 28, 2023

(54) AGGREGATE AND CORRELATE DATA FROM DIFFERENT TYPES OF SENSORS

(71) Applicant: Rockwell Automation Technologies, Inc., Mayfield Heights, OH (US)

(72) Inventors: Chirag Malkan, Brookfield, WI (US); Kyle Crum, Bayside, WI (US); David Vasko, Hartland, WI (US); Steven T. Haensgen, New Berlin, WI (US); Bijan SayyarRodsari, Austin, TX (US); Katherine Sokolnicki, Chelmsford, MA (US); Yongyao Cai, Malden, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/406,309

(22) Filed: Aug. 19, 2021

(65) Prior Publication Data
US 2023/0054784 A1 Feb. 23, 2023

(51) Int. Cl.
G06F 11/30 (2006.01)
G08B 21/18 (2006.01)
G01M 99/00 (2011.01)
G05B 19/4155 (2006.01)

(52) U.S. Cl.
CPC ......... G08B 21/182 (2013.01); G01M 99/005 (2013.01); G05B 19/4155 (2013.01); G05B 2219/31449 (2013.01)

(58) Field of Classification Search
CPC ............................ G01M 99/005; G08B 21/182
See application file for complete search history.

(56) References Cited

U.S. PATENT DOCUMENTS

2016/0283443 A1* 9/2016 Michalscheck .... G05B 19/4183
2020/0257261 A1* 8/2020 Koshiishi ........... G05B 19/4184

FOREIGN PATENT DOCUMENTS

JP 2018/216197 * 11/2019
WO 2018216197 A1 11/2018

OTHER PUBLICATIONS

EPO, European Application No. 22189302.7, Extended European Search Report, dated Jan. 16, 2023, pp. 1-8.

* cited by examiner

Primary Examiner — Phuong Huynh
(74) Attorney, Agent, or Firm — Foley & Lardner LLP

(57) ABSTRACT

A method for correlating data from sensors includes receiving sensor information from a plurality of sensors of an industrial operation. Sensor information from component sensors is used for functionality of a component of the industrial operation and sensor information from additional sensors monitor conditions of a portion of the industrial operation different from the component. The method includes deriving, using the sensor information, correlations between component sensors and additional sensors and deriving a baseline signature from the sensor information and the correlations. The baseline signature encompasses a range of normal operating conditions. The method includes identifying an abnormal operating condition based on a comparison between additional sensor information and the baseline signature. The sensor information is used differently for functionality of the component than for deriving the correlations and baseline signature and identifying the abnormal operating condition. The method includes sending an alert with the abnormal operating condition.

20 Claims, 6 Drawing Sheets

AGGREGATE AND CORRELATE DATA FROM DIFFERENT TYPES OF SENSORS

BACKGROUND INFORMATION

The subject matter disclosed herein relates to using sensor information and more particularly relates to aggregating and correlating data from different types of sensors.

BRIEF DESCRIPTION

A method for aggregating and correlating data from different types of sensors is disclosed. A system and computer program product also perform the functions of the method. The method includes receiving sensor information from a plurality of sensors of an industrial operation. Sensor information from one or more component sensors of the plurality sensors is used for functionality of a component of the industrial operation and sensor information from one or more additional sensors of the plurality of sensors monitor conditions of a portion of the industrial operation different from the functionality of the component. The method includes deriving, using the sensor information, correlations between sensor information of sensors of the one or more component sensors and of the one or more additional sensors and deriving a baseline signature from the sensor information and the correlations. The baseline signature encompasses a range of normal operating conditions. The method includes identifying an abnormal operating condition of the industrial operation based on a comparison between additional sensor information from the plurality of sensors and the baseline signature. The sensor information is used differently for functionality of the component than for deriving the correlations and baseline signature and identifying the abnormal operating condition. The method includes sending an alert comprising the identified abnormal operating condition.

A system includes a plurality of sensors sensing conditions on equipment of an industrial operation. One or more component sensors of the plurality of sensors provide sensor information for functionality of a component of the industrial operation and one or more additional sensors of the plurality of sensors provide sensor information to monitor conditions of a portion of the industrial operation different from the functionality of the component. The system includes a sensor module configured to receive sensor information from the plurality of sensors and a correlation module configured to derive, using the sensor information, correlations between sensor information of sensors of the one or more component sensors and of the one or more additional sensors. The system includes a baseline module configured to derive a baseline signature from the sensor information and the correlations. The baseline signature encompasses a range of normal operating conditions. The system includes an error module configured to identify an abnormal operating condition of the industrial operation based on a comparison between additional sensor information from the plurality of sensors and the baseline signature. The sensor information is used differently for functionality of the component than for deriving the correlations and baseline signature and identifying the abnormal operating condition. The system includes an alert module configured to send an alert comprising the identified abnormal operating condition. The modules include one or more of hardware circuits, a programmable hardware device and executable code. The executable code is stored on one or more computer readable storage media.

A computer program product for aggregating and correlating data from different types of sensors includes a computer readable storage medium having program code embodied therein. The program code is executable by a processor to receive sensor information from a plurality of sensors of an industrial operation. Sensor information from one or more component sensors of the plurality sensors is used for functionality of a component of the industrial operation and sensor information from one or more additional sensors of the plurality of sensors monitor conditions of a portion of the industrial operation different from the functionality of the component. The program code is executable to derive, using the sensor information, correlations between sensor information of sensors of the one or more component sensors and of the one or more additional sensors and to derive a baseline signature from the sensor information and the correlations, the baseline signature encompassing a range of normal operating conditions. The program code is executable to identify an abnormal operating condition of the industrial operation based on a comparison between additional sensor information from the plurality of sensors and the baseline signature. The sensor information is used differently for functionality of the component than for deriving the correlations and baseline signature and identifying the abnormal operating condition. The program code is executable to send an alert comprising the identified abnormal operating condition.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
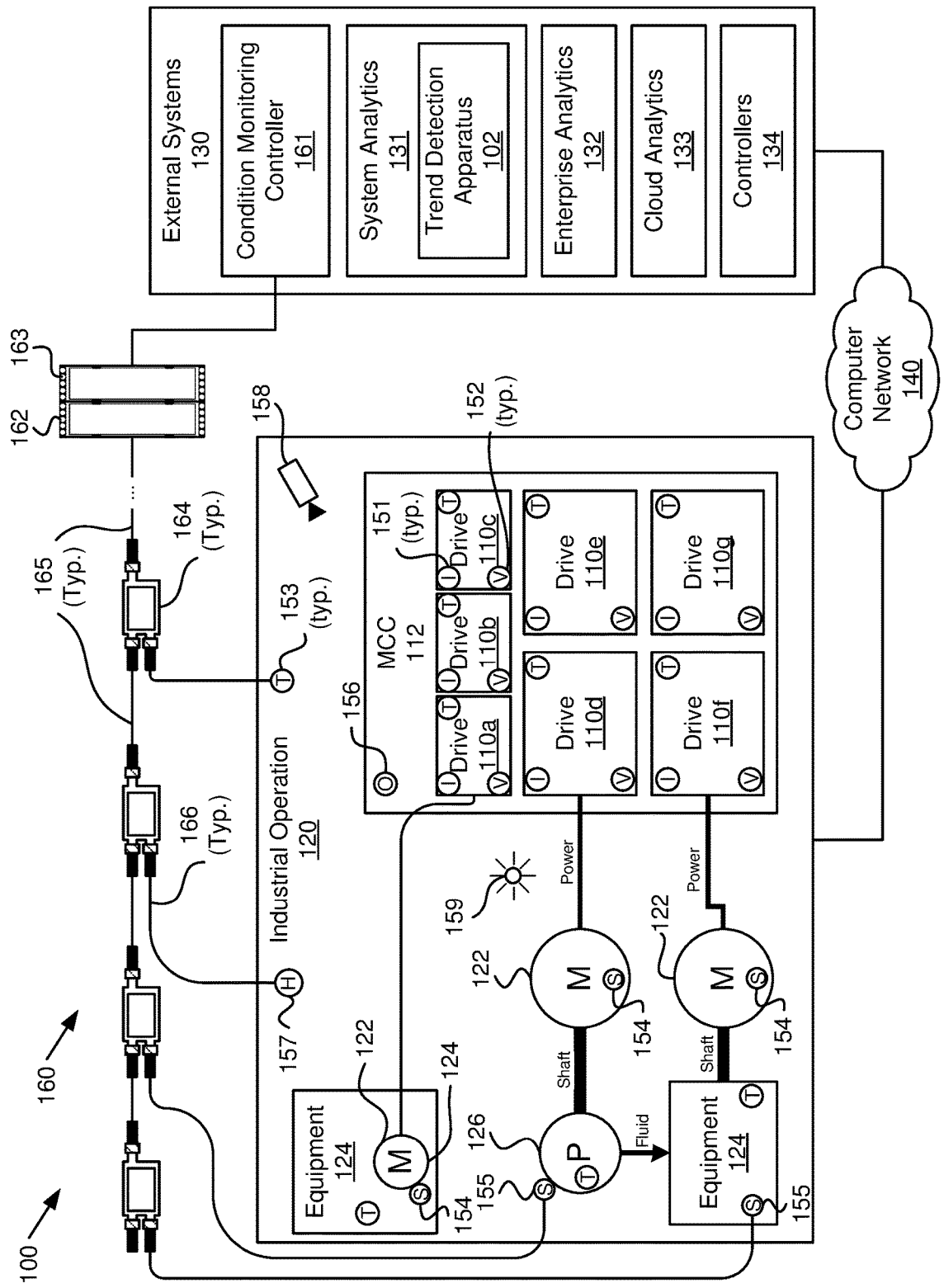
FIG. 1 is a schematic block diagram illustrating one embodiment of an industrial automation environment for aggregating and correlating data from different types of sensors.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

A module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like. Modules may also be implemented in program code and/or software for execution by various types of processors. An identified module of program code may include one or more physical or logical blocks of executable code which may be organized as an object, procedure, or function. Executables of a module need not be physically located together.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device. Computer readable storage media excludes transitory signals.

Program code for carrying out operations for aspects of the present invention may be written in any combination of one or more programming languages, including an object-oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for aggregating and correlating data from different types of sensors is disclosed. A system and computer program product also perform the functions of the method. The method includes receiving sensor information from a plurality of sensors of an industrial operation. Sensor information from one or more component sensors of the plurality sensors is used for functionality of a component of the industrial operation and sensor information from one or more additional sensors of the plurality of sensors monitor conditions of a portion of the industrial operation different from the functionality of the component. The method includes deriving, using the sensor information, correlations between sensor information of sensors of the one or more component sensors and of the one or more additional sensors and deriving a baseline signature from the sensor information and the correlations. The baseline signature encompasses a range of normal operating conditions. The method includes identifying an abnormal operating condition of the industrial operation based on a comparison between additional sensor information from the plurality of sensors and the baseline signature. The sensor information is used differently for functionality of the component than for deriving the correlations and baseline signature and identifying the abnormal operating condition. The method includes sending an alert comprising the identified abnormal operating condition.

In some embodiments, the component is a first component and sensor information from the additional sensors is used for functionality of one or more additional components of the industrial operation. In other embodiments, the one or more additional sensors are general purpose sensors independent of functionality of the component. In other embodiments, identifying the abnormal operating condition includes identifying a trend in the additional sensor information that varies from the baseline signature.

In some embodiments, deriving the correlations from the sensor information includes using a machine learning algorithm to derive the correlations and/or identifying the abnormal operating condition of the industrial operation includes using a machine learning algorithm to identify a trend in the additional sensor information that deviates from the baseline signature. In other embodiments, deriving the baseline signature from the sensor information includes identifying one or more contexts of the industrial operation. The one or more contexts are each for different normal operating conditions in the industrial operation and identifying the abnormal operating condition of the industrial operation includes identifying additional sensor information outside of the one or more contexts.

In some embodiments, the baseline signature includes one or more thresholds and identifying the abnormal operating condition of the industrial operation includes identifying that the additional sensor information exceeds at least one of the one or more thresholds. In other embodiments, the sensor information includes location information for at least a portion of the plurality of sensors and identifying the abnormal condition includes using the location information to identify a source of the abnormal condition.

In some embodiments, the method includes synchronizing the sensor information from the plurality of sensors. In other embodiments, the plurality of sensors includes sensors of different types. In other embodiments, the plurality of sensors sense temperature, vibration, current, voltage, motion, acoustic noise, strain, movement, odor and/or pressure. In other embodiments, the sensor information includes command information about operational commands issued to equipment of the industrial operation. In other embodiments, the component exports sensor information from the one or more component sensors to a computing device external to the component.

A system includes a plurality of sensors sensing conditions on equipment of an industrial operation. One or more component sensors of the plurality of sensors provide sensor information for functionality of a component of the industrial operation and one or more additional sensors of the plurality of sensors provide sensor information to monitor conditions of a portion of the industrial operation different from the functionality of the component. The system includes a sensor module configured to receive sensor information from the plurality of sensors and a correlation module configured to derive, using the sensor information, correlations between sensor information of sensors of the one or more component sensors and of the one or more additional sensors. The system includes a baseline module configured to derive a baseline signature from the sensor information and the correlations. The baseline signature encompasses a range of normal operating conditions. The system includes an error module configured to identify an abnormal operating condition of the industrial operation based on a comparison between additional sensor information from the plurality of sensors and the baseline signature. The sensor information is used differently for functionality of the component than for deriving the correlations and baseline signature and identifying the abnormal operating condition. The system includes an alert module configured to send an alert comprising the identified abnormal operating condition. The modules include one or more of hardware circuits, a programmable hardware device and executable code. The executable code is stored on one or more computer readable storage media.

In some embodiments, the component is a first component and sensor information from the additional sensors is used for functionality of one or more additional components of the industrial operation and the one or more additional sensors are general purpose sensors independent of functionality of the component. In other embodiments, the correlation module deriving the correlations from the sensor information includes using a machine learning algorithm to derive the correlations and/or the error module identifying the abnormal operating condition of the industrial operation includes using a machine learning algorithm to identify a trend in the additional sensor information that deviates from the baseline signature.

In some embodiments, the baseline module deriving the baseline signature from the sensor information includes identifying one or more contexts of the industrial operation. The one or more contexts are each for different normal operating conditions in the industrial operation and the error module identifying the abnormal operating condition of the industrial operation includes identifying additional sensor information outside of the one or more contexts. In other embodiments, the system includes a synchronization module configured to synchronize the sensor information from the plurality of sensors. In other embodiments, the plurality of sensors sense temperature, vibration, current, voltage, motion, acoustic noise, strain, movement in a 3-dimensional space, odor, and/or pressure.

A computer program product for aggregating and correlating data from different types of sensors includes a computer readable storage medium having program code embodied therein. The program code is executable by a processor to receive sensor information from a plurality of sensors of an industrial operation. Sensor information from one or more component sensors of the plurality sensors is used for functionality of a component of the industrial operation and sensor information from one or more additional sensors of the plurality of sensors monitor conditions of a portion of the industrial operation different from the functionality of the component. The program code is executable to derive, using the sensor information, correlations between sensor information of sensors of the one or more component sensors and of the one or more additional sensors and to derive a baseline signature from the sensor information and the correlations, the baseline signature encompassing a range of normal operating conditions. The program code is executable to identify an abnormal operating condition of the industrial operation based on a comparison between additional sensor information from the plurality of sensors and the baseline signature. The sensor information is used differently for functionality of the component than for deriving the correlations and baseline signature and identifying the abnormal operating condition. The program code is executable to send an alert comprising the identified abnormal operating condition.

FIG. 1 is a schematic block diagram illustrating one embodiment of an industrial automation environment 100 for aggregating and correlating data from different types of sensors. The industrial automation environment ("environment") 100 includes a trend detection apparatus 102, drives 110a-110g (individually or generically "110") in a motor control center ("MCC") 112, an industrial operation 120, external systems 130, and a condition monitoring system 160. The industrial operation 120 depicted in FIG. 1 includes machines 122, industrial equipment 124, and a pump 126. External systems 130 include system analytics 131 with the trend detection apparatus 102, enterprise analytics 132, cloud analytics 133, and PLC automation controllers 134.

The industrial operation 120 represents any industrial machine or system which includes various components, such as machines 122 that are rotating machines, which may be powered by a drive 110. The components of the drive 110, MCC 112 and the industrial operation 120 differ depending on a given implementation and machine type. Systems shown herein typically include additional components, fewer components, and different components and are still in accordance with the technology of the present examples. The external systems 130 serve to represent or include any layer of an industrial automation environment external to drives 110, where external analytics collect and analyze data from the industrial operation 120.

The trend detection apparatus 102 receives sensor information from various sensors 151-159 (generically "150") of the industrial automation environment 100 where some of the sensors 150 are used for functionality of a component and other sensors 150 are either for functionality of another component or are sensors that don't have a specific purpose. The trend detection apparatus 102 repurposes sensor information from the various sensors 150 in an opportunistic sensing application. The trend detection apparatus 102 derives correlations between sensor information of the various sensors 150 and the trend detection apparatus 102 derives from the correlations and sensor information a baseline signature representative of normal operating conditions.

The trend detection apparatus 102 uses additional sensor information from the various sensors 150 of the industrial automation environment 100 and identifies an abnormal operating condition based a comparison between the additional sensor information and the signature baseline and then sends an alert that includes the abnormal operating condition. Thus, while sensor information from sensors 150 in one or more components of the industrial automation environment 100 is used for functionality of the components, the sensor information is also used to find correlations between sensors at various operating conditions to then find abnormalities that would not be identified by simply using the sensor information for functionality of the components. Thus, the trend detection apparatus 102 repurposes sensor information for a dual purpose—for component functionality and for trend detection.

As an example, a drive 110 may include current and voltage sensors 151, 152. A temperature sensor 153 may be used to sense high temperatures in a microcontroller of the drive 110. Vibration sensors may be added to a rotating machine 122 controlled by the drive 110 for vibration analysis of bearings. Sensor information may be exported from various components, such as the machine 122, drive 110, etc. to the trend detection apparatus 102. Current and/or voltage sensors 151, 152 may be correlated to various operating conditions of a rotating machine 122, such as low load, full load, overload, may be correlated to various motor speeds, etc. Vibration data, temperature data, etc. may also be correlated to the various operating conditions, current and voltage. For instance, for a particular load under normal operating conditions when the rotating machine 122 is running at low speed, the vibration sensor might sense low vibrations and the temperature sensor 153 might sense a relatively low temperature.

As rotating machine speed increases, sensed vibrations may increase and sensed temperature may increase. The trend detection apparatus 102 correlates, in some embodiments, various rotating machine speeds, current, voltage, vibrations and temperature and the trend detection apparatus 102 may then use the correlations to create a baseline signature. The trend detection apparatus 102 then compares subsequent sensor information with the baseline signature and the trend detection apparatus 102 identifies difference between the subsequent sensor information and the baseline signature to identify abnormal operating conditions, which the trend detection apparatus 102 sends in an alert.

The industrial operation 120 is depicted with drives 110a-g (e.g. 110) in a motor control center 112 and connected to various devices, such as machines 122 which drive or power equipment 124, pumps 126, etc. The machines 122, in some embodiments, are rotating machines or motors. The equipment 124 includes devices typically found in an industrial operation 120, such as equipment on an assembly line, equipment used for processing raw materials, manufacturing equipment, etc. A pump 126 is depicted and is representative of a device driven by a rotating machine 122. The machines 122, equipment 124, pumps 126 and other devices and/or components in an industrial operation 120 include sensors of various types and for various purposes. In addition, an industrial operation 120 may include other sensors 150 mounted external to the devices of the industrial operation 120, such as temperature sensors 153 to measure ambient temperature, access control sensors, and the like. While an industrial operation 120 is depicted, embodiments described herein may include other environments, such as a data center, or other facility with equipment that include sensors for various purposes and where sensor information is available to be repurposed to identify correlations and trends in the sensor information to identify abnormal conditions.

In embodiments with variable frequency drives ("VFDs") and rotating machines, the drive 110 may be a VFD which supplies power to a rotating machine 122 of the industrial operation 120 and receives signal data from the industrial operation 120. An analytic engine in a drive 110, in some embodiments, runs a fault detection process to detect faults within the industrial operation 120 based on the signal data. The drives 110 may also be motor starters or other types of motor controllers that are not VFDs.

The industrial automation environment 100, in some embodiments, includes an external condition monitoring system 160 with a condition monitoring controller 161 where the external condition monitoring system 160 is external to equipment 122-126 and drives 110 of the industrial operation 120. The external condition monitoring system 160, in some embodiments, includes a safety relay 162, a network interface 163, connection taps 164, trunk line conductors 165, and tap conductors 166, and may be connected to various devices and sensors 150 for condition monitoring. The condition monitoring may be for safety, for access control, or the like.

In some embodiments, the external condition monitoring system 160 includes a network interface 163 connected to a safety relay 162. The network interface 163 provides a network connection to the condition monitoring controller 161. For example, the external condition monitoring system 160 may include one internet protocol ("IP") address and may be able to provide information from safety devices through the single IP address to the condition monitoring controller 161. Such an arrangement beneficially reduces the number of IP addresses for a plant with one or more industrial operations 120. Other networking interfaces 163 may include more than one IP address, for example, for multiple safety relays 162 or multiple lines from a safety relay 162. In addition to the sensors, the external condition monitoring system 160 may include other safety devices, such as a non-contact switch, a light curtain, a locking switch, an emergency stop, a light curtain, an actuator, a cable pull switch, a key interlock switch, and the like. In other embodiments, one or more sensors 150 and/or safety devices include an IP address. In other embodiments, the external sensors and/or safety devices run on a proprietary network different than an IP network. In other embodiments, the external sensors connect directly to the condition monitoring controller 161.

The industrial automation environment 100 includes various sensors 150 placed for different purposes. Over time, sensors have become less expensive, and thus equipment of an industrial operation 120 or in an industrial automation environment 100 include more sensors than previous equipment. For example, where traditional starters, drives, etc. have included current and voltage sensors 151, 152, additional sensors may be included, such as temperature sensors 153, vibration sensors, etc. A temperature sensor 153, vibration sensor or other sensor in a starter, drive 110, etc. may be used to monitor device health, abnormal conditions, may be used for feedback and control, etc. In some components, devices, equipment, systems, etc., sensors 150 may be included that do not have a defined purpose. In addition, equipment of an industrial automation environment 100 increasingly are connected to a computer network so that information from the equipment and sensors 150 is available for analysis. Often, equipment of an industrial operation 120 provide so much information that customers are not sure what to do with the information.

Sensor information from the sensors 150 and equipment in the embodiments described herein may be used for opportunistic sensing. Opportunistic sensing takes advantage of available sensor information where the sensor information may then be used for multiple purposes. For example, a drive 110 may use current and voltage sensors for controlling a machine 122, for overload protection, for opening contacts based on overcurrent, etc. Where a temperature sensor 153 is also included in a drive 110, temperature sensor information could be correlated with loading conditions. Typically, as load on a machine 122 increases, current increases and temperature increases. Correlating operating conditions for the drive 110 with current and temperature may then define a range of normal operating conditions, even though temperature of the drive 110 may be relatively high at times. Where temperature of the drive 110 increases while current remains low, this identified temperature increase may signal an abnormal condition in the drive 110, such as a loose connection, debris buildup in contacts, etc. Thus, using the current, voltage, temperature, etc. information in a different way than originally intended is part of the opportunistic sensing idea and can provide additional insight into operation of the equipment of the industrial operation 120.

Some of the sensors 150 that may be included in the industrial automation environment 100 include current sensors 151, voltage sensors 152, temperature sensors 153, internal sensors 154 that are integral with components, such as rotating machines 122, external sensors 155 which are external to components and may be added after manufacture or after installation. The internal and external sensors 154, 155 may include vibration sensors, acoustic sensors, and the like. Other sensors 150 that may be included include odor sensors 156, humidity sensors 157, optical sensors 158, motion sensors 159, and the like. While various sensors 150 are depicted in FIG. 1, one of skill in the art will recognize other sensors that may be included in an industrial automation environment 100.

All of the sensors 150 described herein have an ability to export sensor information to the trend detection apparatus 102, such as through the computer network 140. Some sensors 150 are connected directly to the computer network 140, such as through a component in which they are embedded. Other sensors 150 have a wireless connection. Other sensors 150 provide sensor information to another device and the other device exports the sensor data to the computer network 140. For example, a rotating machine 122 may transmit sensor information to a drive 110 and the drive 110 exports the sensor information. While a single line is depicted from the computer network 140 to the industrial operation 120, the single line represents multiple network connections.

The current sensors 151 and voltage sensors 152, in various embodiments, may be embedded in equipment, such as a drive 110, a circuit breaker, a motor starter, etc. and may be used for functionality of the equipment but also have the ability to export sensor information. In other embodiments, the current and voltage sensors 151, 152 are external to the equipment. For example, a current sensor 151 may include a current transformer placed around one or more conductors in the industrial operation 120.

Likewise, the temperature sensors 153 may be internal or external to components. For example, a temperature sensor 153 may be embedded in a microprocessor where sensor information from the temperature sensor 153 may be used to monitor a processor, a core, memory, etc. and the sensor information is also available to be exported for other purposes. Increasingly, the components of an industrial operation 120 include microprocessors, which may include various sensors 150 capable of exporting sensor information. In other embodiments, the temperature sensors 153 are mounted in strategic locations for use by equipment of an industrial operation 120. For example, a temperature sensor 153 may be placed in a workspace, in an enclosure, etc. to monitor ambient temperature conditions. In other embodiments, a temperature sensor 153 may be placed in an enclosure that includes other equipment, such as in a bucket of an MCC 112, but external to a drive 110. One of skill in the art will recognize other locations and uses of a temperature sensors 153.

The internal sensors 154 are described as internal in that the internal sensors 154 are included with components and provide sensor information through communication channels of the components. For example, a machine 122, such as a motor, may include a sensor that transmits sensor information to a drive 110 and the sensor information is then available at the drive 110. The external sensors 155 are described as external in that the external sensors 155 are not integral with the machines 122 and/or drives 110.

The term "external sensor" and "internal sensor" are used merely to connote that the external sensors 155 are connected to the external condition monitoring system 160 or other system and the internal sensors 154 are built into machines 122 or other components and may provide sensor information to the drives 110 and "internal" versus "external" are not used herein to describe actual location of the sensors 154, 155 with respect to components. In some embodiments, sensor information from the external sensors 155 complement sensor information from the internal sensors 154 and may facilitate locating an abnormal operating condition, such as a potential failure. For example, vibration data from an external vibration sensor 155 in a pump 126 along with vibration data from an internal sensor 154 in a connected machine 122 may be used to determine if the source of the vibration is in the pump 126 or machine 122. The internal and external sensors 154, 155 may be any type of sensor 150. Note that "sensor 150" includes other sensors not specifically depicted in FIG. 1.

In some embodiments, the industrial automation environment 100 includes one or more internal or external sensors 154, 155 which are vibration sensors located in various equipment (e.g. 125, 126) of the industrial operation 120. The vibration sensors, in some embodiments, are positioned to detect vibration in bearings, bearing races, belts, gears, and the like, to detect cavitation in the pump 126 or other potential sources of vibration. In other embodiments, the external condition monitoring system 160 includes acoustic sensors to detect sound caused by vibration or other problem noises. In some embodiments, the acoustic sensors can be used to detect vibrations. For example, an acoustic sensor may be used to detect vibrations associated with various modes of bearing failure, such as bearings in a rotating machine 122. Some vibrations are in the 20-40 kHz range or even higher and an acoustic sensor may be useful to detect the higher frequency vibrations. One of skill in the art will recognize other equipment and locations in the industrial operation 120 to monitor with a vibration sensor, acoustic sensors, etc. The vibration sensors may be accelerometers, may be piezoelectric sensors, such as integrated circuit piezoelectric ("ICP") industrial accelerators, etc. In some embodiments, the sensors 150 are dual output sensors, which may measure two parameters such as vibration and temperature.

In some embodiments, the industrial automation environment 100 includes an odor sensor 156. Odor sensors 156 are smell sensors and are becoming increasingly popular and may be used for a variety of reasons. For example, an odor sensor 156 may be used to detect a smell or odors associated with burning, overheating, or other abnormal condition. Odor sensors 156 may be strategically placed in a drive 110, a MCC 112, equipment 124 or within the industrial operation 120 and may be used for a specific purpose for equipment. In addition, the sensor information from an odor sensor 156 may be exported for use with the trend detection apparatus 102.

In some embodiments, the industrial automation environment 100 includes one or more humidity sensors 157 to monitor humidity in or around the industrial operation 120. In other embodiments, the external condition monitoring system 160 includes one or more temperature sensors 153 to monitor temperature in or around the industrial operation 120. In other embodiment, one or more temperature sensors 153 are located inside equipment. Abnormal temperature may increase equipment failures. In other embodiments, the external condition monitoring system 160 includes other sensors 150, such as chemical sensors, to monitor conditions in the industrial operation 120. One of skill in the art will recognize other sensors 150 useful by the trend detection apparatus 102 to predict abnormal conditions.

In some embodiments, the industrial automation environment 100 includes one or more optical sensors 158. Optical sensors 158 include various types of sensors, such as cameras, sensors that detect a break in a beam of light, and the like. For example, a camera may detect motion, may detect personnel, may detect movement of equipment such as a forklift, etc., which is helpful in determining where certain vibrations are coming from, when personnel are affecting a machine, etc. A beam detector may be used to determine when personnel have opened a compartment, etc. A beam detector may be used to detect smoke or other airborne particles. The optical sensors 158 thus are helpful in determining abnormal conditions as well as when normal operations are being affected so that derivation of a baseline signature may be halted until normal conditions occur.

In some embodiments, the industrial automation environment 100 includes one or more motion sensors 159. The motion sensors 159, in some embodiments, detect motion of any type in a particular location. In other embodiments, the motion sensors 159 detect motion, direction, velocity, etc. in a three-dimensional space, which can be useful in determining if personnel or equipment is moving towards equipment 124, machines 122, etc. The motion sensors 159 are helpful in determining abnormal conditions as well as when normal operations are being affected so that derivation of a baseline signature may be halted until normal conditions occur.

The external systems 130 are depicted outside the industrial operation 120 to signify that information from the MCC 112, drives 110, machines 122, equipment 124, pumps 126, condition monitoring system 160, etc. export information. In some embodiments, the external systems 130 are located at a different site than the industrial operation 120. In other embodiments, the external systems 130 are collocated with the components of the industrial operation 120 and condition monitoring system 160. Typically, the external systems 130 provide higher level control and analysis not available in the components of the industrial operation 120 and condition monitoring system 160. In some embodiments, the external systems 130 have higher computing capabilities than many of the component of the industrial operation 120 and condition monitoring system 160.

The drives 110, in some embodiments, include an analytics engine. While the analytics engine may be in communication with any analytics system of the external systems 130, for some types of faults/failures the analytics engine does not require external systems 130 to perform fault analysis. The analytics engine uses sensor information from the drive 110 and/or machine 122 to determine that a fault or failure has occurred and information about certain faults or failures is fed to the external systems 130. In some embodiments, the raw sensor information is also made available past the analytics engine to the trend detection apparatus 102.

In some examples, an enterprise may use the analytic engine as one component of a greater condition monitoring and analysis system within the enterprise. In other embodiments, the trend detection apparatus 102 uses raw sensor information from the drives 110 or machine 122. A modular topology may utilize the analytic engine at the device level in addition to processes and analyses performed at the system and enterprise level, such as condition monitoring by the external condition monitoring system 160. At the device level, the analytic engine may collect data from internal sensors 154 of devices of the industrial operation 120 and other sources in various formats.

The analytics engine may use collected data to perform condition monitoring, power and energy monitoring, predictive life analysis, load characterization, or similar analyses. At the system level, system analytics 131 may aggregate and contextualize information to detect system level fault conditions and/or provide insights related to preventative maintenance, energy diagnostics, system modeling, performance optimization, and similar insights. The trend detection apparatus 102, in some embodiments, furthers functionality of the system analytics 131.

At the enterprise level, enterprise analytics 132, cloud analytics 133, or a combination thereof may work together with the trend detection apparatus 102 to present information to users on devices and systems including mobile devices and desktop computers to enable remote learning, machine learning, and root cause analysis. Specifically, the trend detection apparatus 102 may use information from the analytic engine and from the condition monitoring controller 161 to predict and detect abnormal conditions, such as impending failures. In FIG. 1 the trend detection apparatus 102 is depicted in the system analytics 131, but may reside in the enterprise analytics 132, condition monitoring controller 161, a server, a cloud computing environment, or other convenient location.

The computer network 140 may be wired, wireless or a combination of both. The computer network 140 may include a local area network ("LAN"), a wide area network ("WAN"), a fiber optic network, a proprietary network, the Internet, a wireless connection, and/or the like. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® (IrDA®). Alternatively, the wireless connection may include a cellular telephone network communication. All standards and/or connection types include the latest version and revision of the standard and/or connection type as of the filing date of this application.

Figure 2:
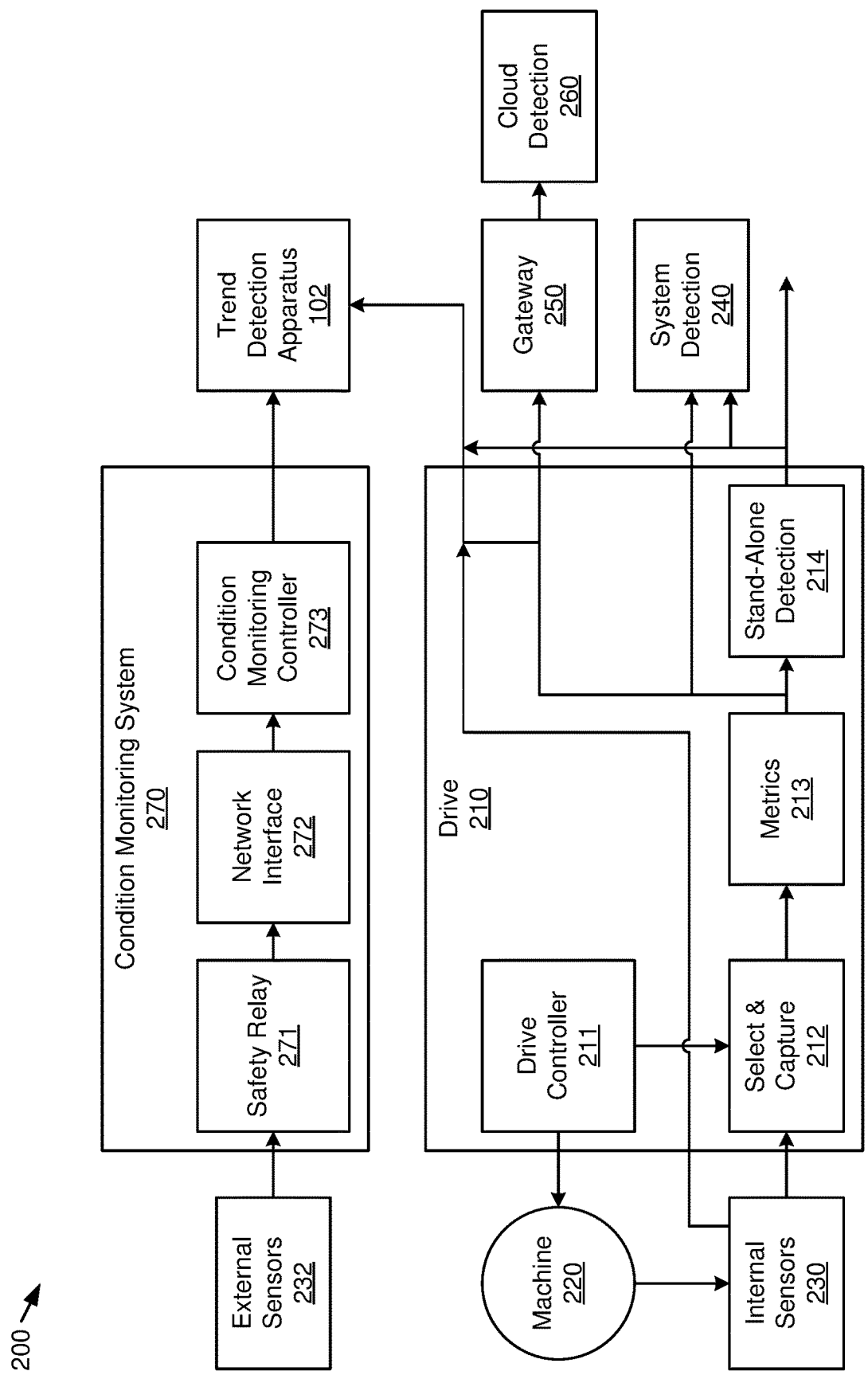
FIG. 2 is a schematic block diagram illustrating a process associated with an embodiment of a trend detection apparatus for aggregating and correlating data from different types of sensors.

FIG. 2 is a schematic block diagram illustrating a process 200 associated with an embodiment of a trend detection apparatus 102 for aggregating and correlating data from different types of sensors 150. FIG. 2 depicts an embodiment of how sensor information primarily used for fault analysis can be exported to the trend detection apparatus 102 along with other sensor information from a condition monitoring system 270 for the trend detection apparatus 102 to repurpose the sensor information to identify abnormal conditions.

The process 200 includes a drive 210, and in some embodiments, is representative of a drive 110 of FIG. 1, which may be variable frequency drive and may also include an analytics engine. Components of the drive 210 serve to represent functionality of a drive comprising an analytics engine for device-level condition monitoring. A drive controller 211 provides an output supplied to a machine 220, which may be representative of any machine-driven industrial operation including the industrial operation 120 of FIG. 1. The internal sensors 230 may include vibration, temperature, acoustic, or other external sensors 232 that collect data related to operation of the machine 220 and provide the data to a select and capture module 212.

The select and capture module 212, in some embodiments, collects data from a drive signal or internal sensors 230, depending on what signal is selected, and provides the captured data to a metrics module 213. The select and capture module 212, in some embodiments, is used during baseline and runtime captures, such as at different machine speeds and loading conditions. The metrics module 213 processes the data to generate metrics data that can be utilized for fault detection and prediction by the trend detection apparatus 102. In other embodiments, the internal sensors 230 provide information through the drive 210 to the trend detection apparatus 102.

The data collected by the select and capture module 212 and processing performed by the metrics module 213 may, in some embodiments, depend on settings specific to one or more fault conditions being monitored. For example, for a given fault condition, settings may change which drive signal is selected to capture in the select and capture module 212 as well as the manner in which the metrics module 213 processes the data by changing signal paths to implement various filters and algorithms, performing measurements, utilizing specific parameters, or other settings that may affect processing to produce metrics specific to a fault condition. In some embodiments, metrics are calculated independently for baseline and runtime captures and then differences are calculated between them. Metrics may then be output by the metrics module 213 and provided to one or more systems and modules for condition monitoring, such as to the trend detection apparatus 102.

The output of the metrics module 213 is provided to the stand-alone detection module 214 which may then use the metrics produced by the metrics module 213 to perform fault detection within the drive 210, such as comparing vibration information for a particular machine speed with a vibration signature for the machine speed to identify faults. Stand-alone detection, in some examples, includes determining if one or more fault conditions is present based on the settings specific to at least one fault being monitored. Detection methods include thresholding or machine learning. In addition to supplying the metrics to the stand-alone detection module 214, metrics may be provided to additional systems for condition monitoring or other purposes.

In the present example, metrics are provided to the trend detection apparatus 102 for predicting and detecting abnormal conditions. In a further example, metrics are provided to a system detection module 240 for other system-level fault/failure detection. Metrics, in some embodiments, are also provided to gateway 250 and ultimately to cloud detection module 260 for enterprise-level fault detection. Metrics may also be provided to additional systems or locations. Similarly, stand-alone detection module 214 may provide detection results to one or more external locations including system detection module 240. In some embodiments, the stand-alone detection module 214 may provide results to a gateway 250, a cloud detection module 260, or any other system in communication with the stand-alone detection module 214.

One or more external sensors 232 in the depicted embodiment, such as the external sensors 155 of FIG. 1, provide information to a safety relay 271 of a condition monitoring system 270, such as the safety relay 162 and the external condition monitoring system 160 of FIG. 1. The safety relay 271 provides information to a network interface 272 for transmittal over a computer network to a condition monitoring controller 273, which transmits information to trend detection apparatus 102. In some embodiments, the network interface 272 is similar to the network interface 163 and the condition monitoring controller 273 is similar to the condition monitoring controller 161 of FIG. 1. The network interface 272, in some embodiments, is a network gateway with an IP address. In other embodiments, the external sensors 232 transmit data directly to the condition monitoring controller 273.

Figure 3:
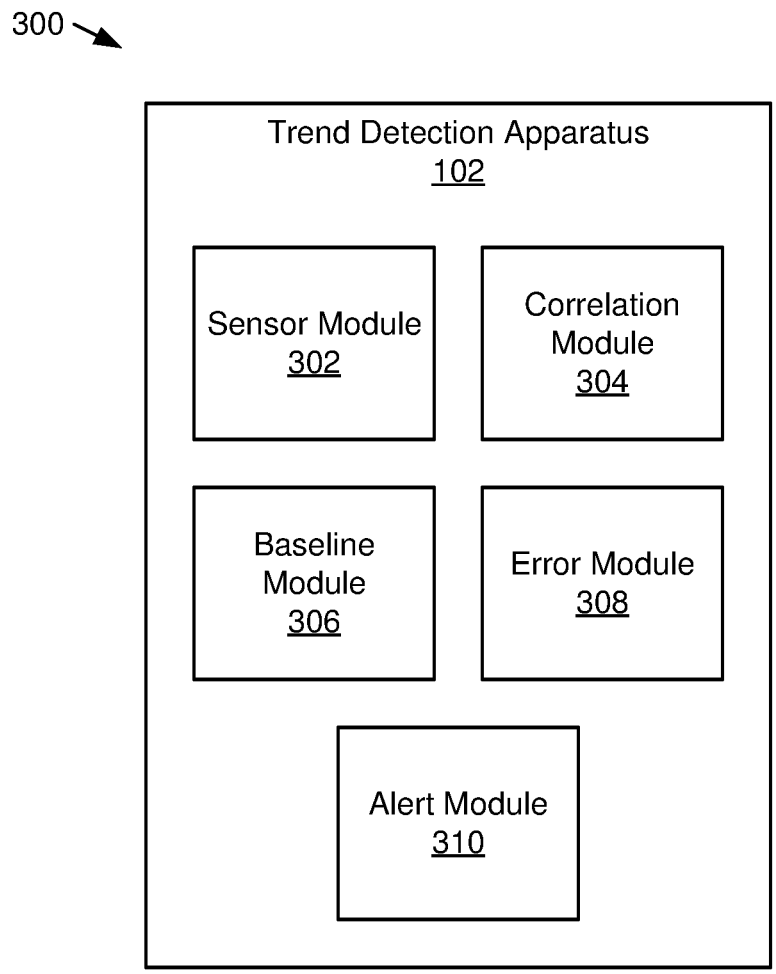
FIG. 3 is a schematic block diagram illustrating one embodiment of an apparatus for aggregating and correlating data from different types of sensors.

FIG. 3 is a schematic block diagram illustrating one embodiment of an apparatus 300 for aggregating and correlating data from different types of sensors 150. The apparatus 300 includes one embodiment to the trend detection apparatus 102 with a sensor module 302, a correlation module 304, a baseline module 306, an error module 308, and an alert module 310, which are described below. The apparatus 300, in some embodiment is implemented with program code stored on computer readable storage media, which is non-transitory. The program code is executable by a processor, such as a server executing program code of the system analytics 131. In other embodiments, the apparatus 300 is implemented in a controller. For example, the controller may be in a MCC 112, drive 110 or other device. The controller may include program code and may also be implemented completely or partially with hardware circuits. In some embodiments, the apparatus 300 is implemented completely or partially with a programmable hardware device, such as an FPGA. For example, the apparatus 300 may be implanted as a controller as an FPGA where some elements of the apparatus 300 are implemented with hardware circuits, such as the sensor module 302 that may have some hardware connections to sensors 150. One of skill in the art will recognize other ways to implement the apparatus 300.

The apparatus 300 includes a sensor module 302 configured to receive sensor information from a plurality of sensors 150 of an industrial operation 120. Sensor information from one or more component sensors of the plurality sensors 150 is used for functionality of a component of the industrial operation 120. Component sensors, as used herein, are sensors that provide information to a component of the industrial operation 120. For example, a drive 110, in some embodiments, is a component and may include a current sensor 151, a voltage sensor 152, a temperature sensor 153, and possibly other sensors 150, all of which may be used for driving a machine 122, for fault detection, for overcurrent detection, for overload protection, etc. Sensor information from the component sensors of the drive 110, in some embodiments, is received by the sensor module 302. The sensor information may be analog or digital.

The sensor module 302 also receives sensor information from one or more additional sensors of the plurality of sensors 150 to monitor conditions of a portion of the industrial operation 120 different from the functionality of the component. In some examples, the one or more additional sensors monitor equipment 124, in a pump 126, etc. which are components of the industrial operation 120 different than the component sensors of a drive 110. The equipment 124, pump 126 and other components of the industrial operation 120 use sensor information from the additional sensors for functionality of the equipment 124, pump 126, etc. Again, the sensor module 302 receives sensor information from the sensors of the equipment 124, pump 126, etc.

In other embodiments, the additional sensors are general purpose sensors independent of functionality of the component and are placed in the industrial operation 120 and do not have a specific purpose. In some examples, components of the industrial operation 120 include integrated circuits, standard parts, etc. that have several built-in sensors where only a portion of the sensors are used but sensor information is available from all of the built-in sensors. In other embodiments, the components include general purpose sensors intended to provide sensor information for purposes defined by an end user.

In some embodiments, the additional sensors are strategically placed to be used by the trend detection apparatus 102. In some examples, the additional sensors are so-called peel-and-stick sensors that may be vibration sensors, temperature sensors 153, etc. and may be placed to provide desired sensor information of a particular type at a particular location for use by the trend detection apparatus 102. The component sensors and additional sensors make up the plurality of sensors 150 of the industrial operation 120.

The apparatus 300 includes a correlation module 304 configured to derive, using the sensor information, correlations between sensor information of sensors 150 of the one or more component sensors and of the one or more additional sensors. The correlation module 304, in some embodiments, derives the correlations during normal operation. For example, where a rotating machine 122 includes a vibration sensor and a temperature sensor 153 and the drive 110 providing power to the rotating machine 122 includes a current sensor 151, a voltage sensor 152, and a temperature sensor 153, the correlation module 304 may track sensor information for various speeds of the rotating machine 122, various load levels, etc. The correlation module 304 may then correlate sensor information for various operating points so that at 50% speed and 100% load, a particular current, voltage, temperature and vibration level may be expected, at 75% speed and 100% load a particular current, voltage, temperature and vibration level may be expected with some values different than at the 50% speed level. The current would increase and increased vibrations and temperature may also be expected.

At the same time, the correlation module 304 derives correlations for other components, such as machines 122, equipment 124, pumps 126, etc. in the industrial operation 120. As load varies for the various drives 110 of the MCC 112, additional correlations may be derived. For example, temperature rise in lower drives (e.g. 110*f*, 110*g*) may affect temperatures in upper drives (e.g. 110*a-e*). An ambient temperature rise in an enclosure, building, etc. of the industrial operation 120 may also affect temperatures of components of the MCC 112, drives 110, machines 122, etc. Where typical sensing within a drive 110 may be used to determine if a fault exists, may be used to control the rotating machine 122, etc., additional sensor information, such as from temperature sensors 153 of the drive 110 and other drives provide additional correlations not normally tracked at the component level. The correlation module 304 is able to derive correlations not available at the component level, but instead across a system level or sub-system level. The correlations may include how vibration increases at a drive 110 based on vibrations caused by increasing speed of a nearby rotating machine 122.

In some embodiments, the correlation module 304 derives the correlations by identifying sensors 150 that are related. The correlation module 304, in some embodiments, also derives correlations between sensors 150 and commanded or measured operating conditions. For example, a commanded speed may be correlated with current. In some examples, the correlation module 304 identifies correlations between sensors by correlating rise and fall of sensor information for two or more sensors. For example, the correlation module 304 may correlate current of a drive 110 with temperature measured within the drive 110. The correlation module 304 may relate increased current with increased temperature. In other embodiments, the correlation module 304 may determine that other correlations do not exist. For example, voltage of a drive 110 may remain constant as temperature changes. In other examples, vibrations at a particular machine 122 may not result in vibrations at equipment 124 or another machine 122 a distance away. Thus, the correlation module 304 identifies correlations among various sensors 150 and operating data while determining correlations do not exist where no correlation is observed.

The apparatus 300 includes a baseline module 306 configured to derive a baseline signature from the sensor information and the correlations derived by the correlation module 304. The baseline signature encompasses a range of normal operating conditions. The baseline signature, in some embodiments, includes sensor information data points for various operating conditions. For example, the baseline signature may include data for various loading conditions of equipment 124, various speeds and loading conditions of rotating machines, various speeds, flow rates, pressure, etc. for pumps 126, etc. In some embodiments, the baseline module 306 interpolates between operating points to further define a baseline signature. In other embodiments, as additional sensor information is gathered, the baseline module 306 adjusts interpolated data to accommodate the new sensor information.

In some embodiments, for various operating points the correlation module 304 includes a range in the baseline signature for one or more sensors. In other embodiments, the correlation module 304 uses various data points of the signature information of a particular sensor to derive a representative data point for the baseline signature, for example by averaging data points of the signature information for a particular sensor. One of skill in the art will recognize other ways to statistically derive a data point for a sensor to be used in the baseline signature for a particular operating condition.

The baseline module 306, in various embodiments, derives the baseline signature in various forms. For example, the baseline signature may be a database, a table, a matrix, or other suitable data structure. In some embodiments, the baseline module 306 derives the baseline signature to include one or more equations to represent various operating conditions. The correlation module 304, in various embodiments, uses curve fitting or other similar technique to derive the equations.

The apparatus 300 includes an error module 308 configured to identify an abnormal operating condition of the industrial operation 120 based on a comparison between additional sensor information from the plurality of sensors 150 and the baseline signature. The error module 308, in some embodiments, identifies a departure or trend from the baseline signature as an abnormal condition. For example, where temperature of a component rises while current is constant, the error module 308 determines that there is a trend that is a variation from the baseline signature and identifies an abnormal operating condition. The baseline signature may include a correlation between current and temperature so that when temperature rises while the current does not rise accordingly, then the error module 308 flags the temperature rise as an abnormal condition.

In other embodiments, the error module 308 recognizes other correlations that would result in a temperature rise and identifies an abnormal condition after verifying that other sensor information correlated with the temperature rise would not result in the temperature rise. As an example, where temperature of a drive 110 rises and current in the drive 110 remains constant, the temperature rise may be the result of ambient temperature rise in a space close to the drive 110. For example, ambient temperature may vary based on sun load of a building housing the drive 110 or may vary seasonally and ambient temperature in a space that includes the drive 110 may then affect temperature in the drive 110. The error module 308 may determine that current is constant and ambient temperature has not changed but the temperature of the drive 110 has risen so the error module 308 then identifies and abnormal condition.

In other embodiments, the baseline signature includes one or more thresholds and the error module 308 identifying an abnormal operating condition of the industrial operation includes identifying that the additional sensor information exceeds at least one of the one or more thresholds. For example, the one or more thresholds may be a particular amount past values of the baseline signature. For example, where a normal operating temperature for a sensor at a particular set of operating conditions, a threshold may be a certain amount above the normal operating temperature. In some embodiments, the thresholds form equations, curves, surfaces, etc. a certain amount past the baseline signature. In other embodiments, the baseline signature is set to a threshold amount past normal operating points.

The error module 308 uses sensor information differently for functionality of the component than for deriving the correlations and baseline signature and identifying the abnormal operating condition. Thus, the error module 308 uses the sensor information of a sensor 150 of a component in a different way than the component uses the sensor information. For example, a drive 110 may use current for identifying a fault condition while the error module 308 uses the current of the drive 110 to determine if the current varies from correlations in a baseline signature in a way that signals to the error module 308 that there is a departure from the baseline signature. Thus, the sensor information is used for additional purposes by the error module 308, the baseline module 306, the correlation module 304, etc. than the same sensor information is used by a component of the industrial operation 120.

The apparatus 300 includes an alert module 310 configured to send an alert that includes the identified abnormal operating condition. In some embodiments, the alert module 310 sends the alert to a system administrator, machine operator, or the like. In other embodiments, the alert module 310 sends the alert to a machine and the machine takes action. In various embodiments, the alert is an analog signal, a digital signal, an email, a file, a text message, or other suitable format. In some embodiment, the alert module 310 sends an alert that triggers sending additional information about the abnormal condition. For example, the abnormal condition may be indicative of immanent failure of a component so the alert module 310 identifies the abnormal condition and the component about to fail. In other embodiments, the alert includes information about a part, device, etc. and where a replacement may be obtained. One of skill in the art will recognize other forms of an alert and what is included in the alert.

Figure 4:
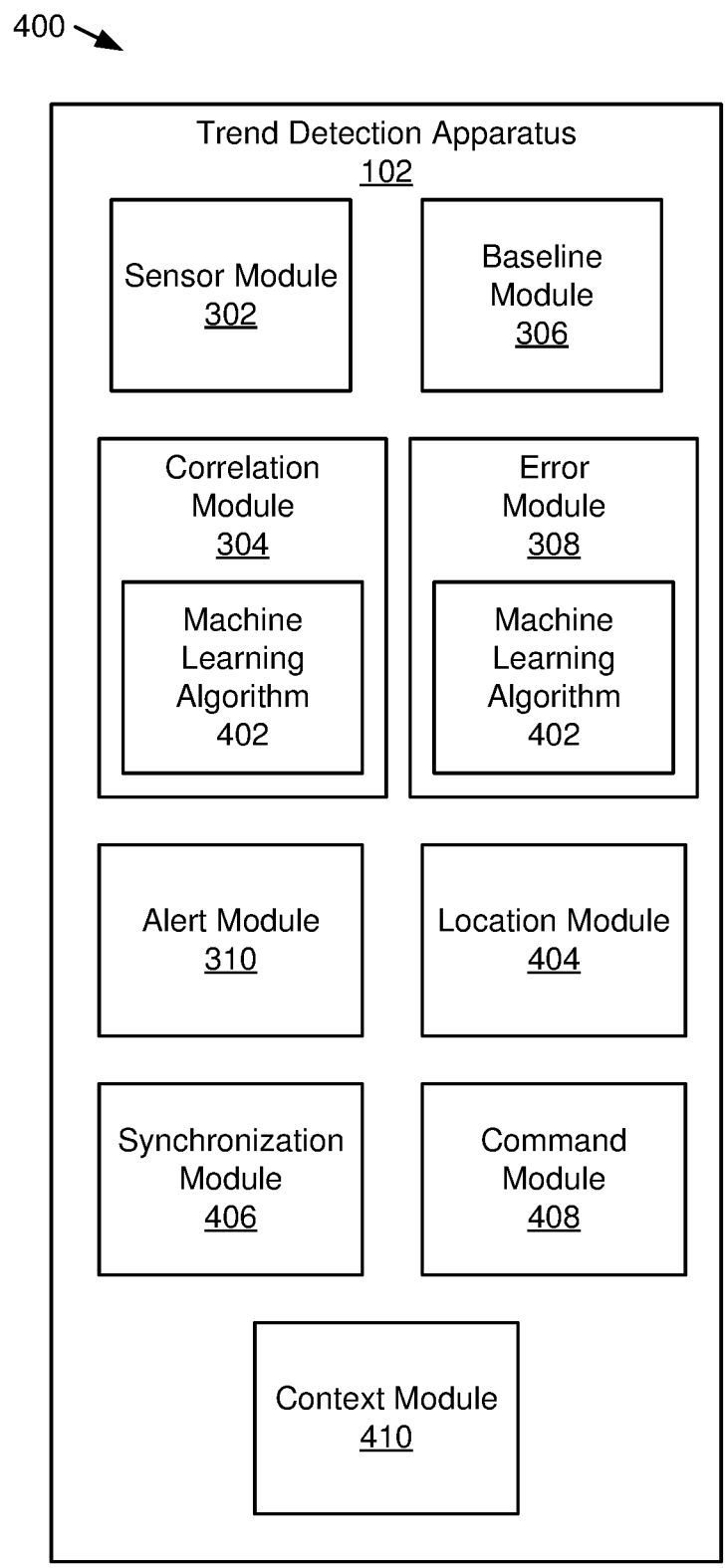
FIG. 4 is a schematic block diagram illustrating another embodiment of an apparatus for aggregating and correlating data from different types of sensors.

FIG. 4 is a schematic block diagram illustrating another embodiment of an apparatus 400 for aggregating and correlating data from different types of sensors. The apparatus 400 includes another embodiment of the trend detection apparatus 102 that includes a sensor module 302, a correlation module 304, a baseline module 306, an error module 308, and an alert module 310, which are substantially similar to those described above in relation to the apparatus 300 of FIG. 3. The apparatus 400 includes a machine learning algorithm 402 in the correlation module 304 and/or the error module 308, a location module 404, a synchronization module 406, a command module 408, and/or a context module 410, which are described below. The apparatus 400, in various embodiments, is implemented in similar ways as described for the apparatus 300 of FIG. 3.

In some embodiments, the apparatus 400 includes a machine learning algorithm 402, which may assist various modules, such as the correlation module 304 and/or the error module 308. In some examples, the correlation module 304 uses the machine learning algorithm 402 to derive the correlations from the sensor information. Sensor information from the plurality of sensors 150 and other information of the industrial operation 120 may be inputs for the machine learning algorithm 402, which then derives correlations between sensor information of the sensors 150. As sensor information is input to the machine learning algorithm 402, correlations are identified and modified over time.

In other embodiments, the baseline module 306 uses the machine learning algorithm 402 in deriving the baseline signature. In other embodiments, the error module 308 also uses the machine learning algorithm 402 to identify the abnormal operating conditions in the industrial operation 120 using sensor information. In some embodiments, the machine learning algorithm 402 uses additional sensor information gathered after the baseline signature is derived to identify an abnormal condition. For example, the machine learning algorithm 402 may identify a trend that exceeds the baseline signature.

In some embodiments, the machine learning algorithm 402 is a deep neural network with sensor information of the sensors 150 as input. Other inputs to the deep neural network may be system commands or other system data that help to define operating conditions. One of skill in the art will recognize other ways that a machine learning algorithm 402 may be used by the apparatus 400 to derive correlations, a baseline signature, abnormal conditions, etc.

The apparatus 400 includes, in some embodiments, a location module 404 configured to identify and/or store sensor location information of at least a portion of the sensors 150 and the modules 304, 306, 308, 402, 406, 408 use the location information to identify correlations, a baseline signature, abnormal condition, etc. For example, the correlation module 304 may include location information of the sensors 150 to derive correlations. In the example, sensors 150 located a great distance away from each other may be less likely to be correlated and the correlation module 304 may exclude correlations between sensors 150 a certain distance apart. In other embodiments, the error module 308 may use location information along with other sensor information to identify a location of an abnormal condition. In other embodiments, the correlation module 304 may consider location information from the location module 404 and possibly timing when identifying correlations.

In some embodiments, the location module 404 gathers location information from the sensors or from another source. In other embodiments, the location module 404 receives location information from a user or from another source. In various embodiments, the location module 404 makes location information available to the apparatus 400. One of skill in the art will recognize other uses of the location information in deriving correlations, a baseline signature and/or abnormal conditions and how to gather location information.

The apparatus 400 includes, in some embodiments, a synchronization module 406 configured to synchronize the sensor information from the plurality of sensors 150. In some embodiments, the synchronization module 406 uses a central clock and the various sensors 150 of the industrial operation 120 have access to the central clock to timestamp sensor information. In other embodiments, the machines 122, equipment 124, etc. include a clock where the synchronization module 406 synchronizes the clocks and then the machines 122, equipment 124, etc. timestamps sensor information. In other embodiments, the synchronization module 406 uses expected time delays from sensors 150 to synchronize sensor information. In other embodiments, the synchronization module 406 uses events to synchronize the sensor information. Beneficially, synchronizing the sensor information the correlation module 304 and the error module 308 to correctly relate sensor information helps in deriving correlations, a baseline signature, abnormal conditions, etc.

The apparatus 400, in some embodiments, includes a command module 408 configured to provide operational commands issued to equipment (e.g. 122, 124, 126, etc.) of the industrial operation 120 as part of the sensor information. For example, the operations commands may include motor speeds, loading conditions, start/stop information, etc. useful in determining normal operation, transient conditions, operating points, etc. and the correlations module 304, the baseline module 306, the error module 308, etc. may use the operational commands along with other sensor information in deriving correlations, a baseline signature, abnormal conditions, etc. For example, an operation command may set a particular speed of a machine 122 while a current sensor 151 provides current information that matches expectations for the speed of the machine 122. A local temperature sensor 153 may indicate an elevated temperature higher than what would be expected from the baseline signature under the current operating conditions so the error module 308 identifies an abnormal condition, which may be a loose connection or something similar.

In some embodiments, apparatus 400 includes a context module 410 that identifies one or more contexts of the industrial operation 120. The correlation module 304, the baseline module 306 and/or the error module 308 use the one or more contexts to derive correlations, derive a baseline signature and/or identify abnormal operations. The one or more contexts are each for different normal operating conditions in the industrial operation 120 and provide further information for the correlations and baseline signature. Where the context module 410 identifies one or more contexts, the error module 308 identifying an abnormal operating condition of the industrial operation includes identifying additional sensor information outside of the one or more contexts.

In some embodiments, the contexts include different operational scenarios, different operating conditions, etc. and may overlap. For example, a context may include a certain manufacturing mode. For instance, one context may include manufacturing a product with a certain type of part or ingredient where another context may include manufacturing the product with different parts and/or ingredients or even manufacturing a different product. In other embodiments, the contexts may include different loading conditions, different machine speeds, etc. In other embodiments, the contexts may include different shifts or operational periods in a day or week. In other embodiments, the contexts include different weather conditions, different seasons, etc.

In some embodiments, certain operating conditions are present for each context and the different contexts may be included in the baseline signature. Each context may be correlated with certain sensor information or ranges of sensor information. The error module 308 identifying an abnormal condition may then include determining that a trend is out of context. One of skill in the art will recognize other ways that contexts identified by the context module 410 are useful in determining deriving correlations, deriving a baseline signature and/or identifying an abnormal condition.

Figure 5:
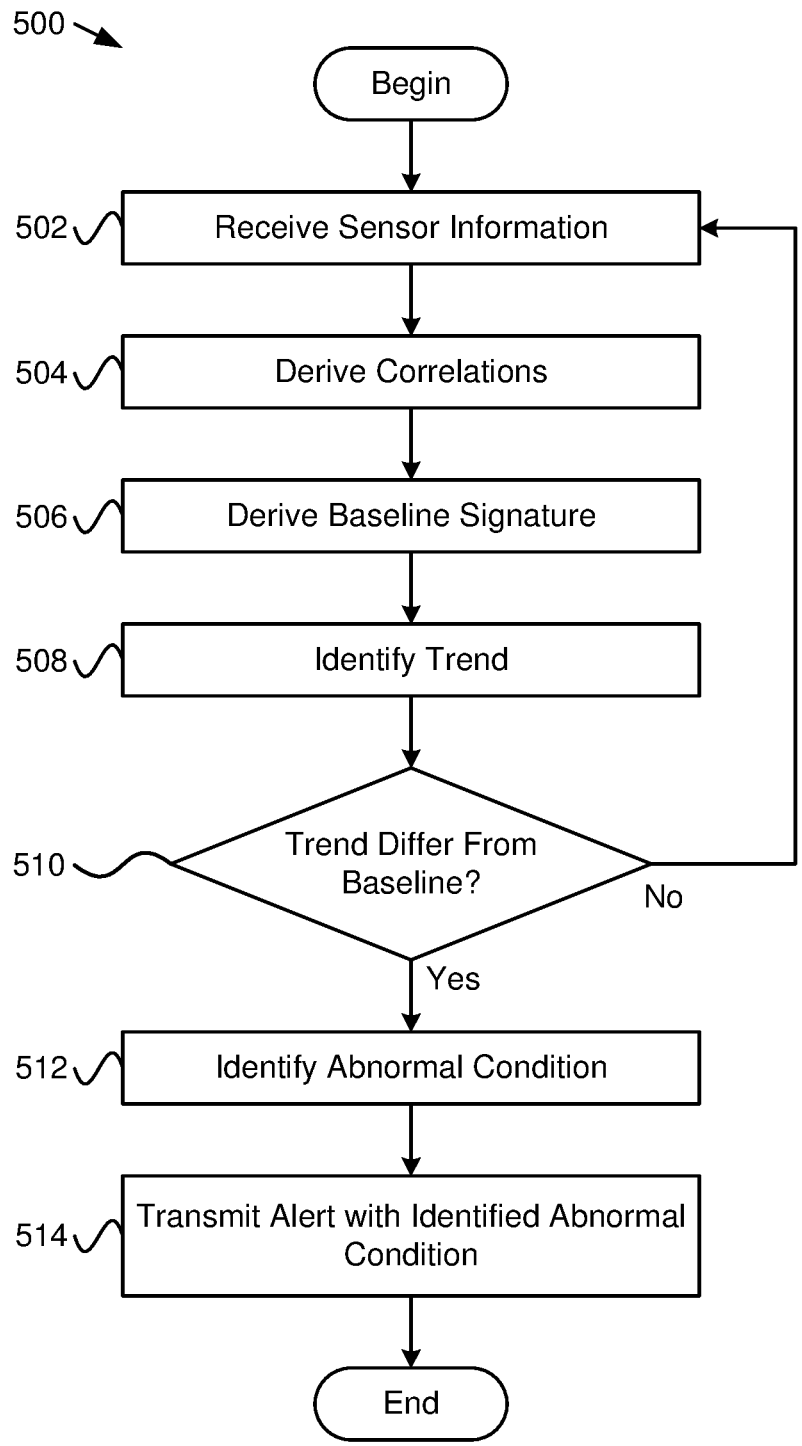
FIG. 5 is a flowchart diagram of one embodiment illustrating a method for aggregating and correlating data from different types of sensors.

FIG. 5 is a flowchart diagram of one embodiment illustrating a method 500 for aggregating and correlating data from different types of sensors. The method 500 begins and receives 502 sensor information from a plurality of sensors 150 of an industrial operation 120. Sensor information from one or more component sensors of the plurality sensors 150 is used for functionality of a component of the industrial operation 120, such as for a machine 122, equipment 124, a pump 126, etc. Sensor information from one or more additional sensors of the plurality of sensors 150 monitor conditions of a portion of the industrial operation 120 different from the functionality of the component. The one or more additional sensors may be from another component or generally placed sensors without a specific purpose.

The method 500 derives 504, using the sensor information, correlations between sensor information of sensors 150 of the one or more component sensors and of the one or more additional sensors and derives 506 a baseline signature from the sensor information and the correlations. The baseline signature encompasses a range of normal operating conditions. The method 500 identifies 508 a trend and determines 510 if the trend differs from the baseline signature. For example, the method 500 may determine 510 id the trend differs from the baseline signature by a certain amount. If the method 500 determines 510 that the trend does not differ from the baseline signature or does not differ by a certain amount, the method 500 returns and receives 502 sensor information.

If the method 500 determines 510 that the trend differs from the baseline signature or differs by a certain amount, the method 500 identifies 512 an abnormal condition from the trend and transmits 514 an alert that includes the abnormal condition, and the method 500 ends. In various embodiments, the method 500 is implemented with one or more of the sensor module 302, the correlation module 304, the baseline module 306, the error module 308 and the alert module 310.

Figure 6:
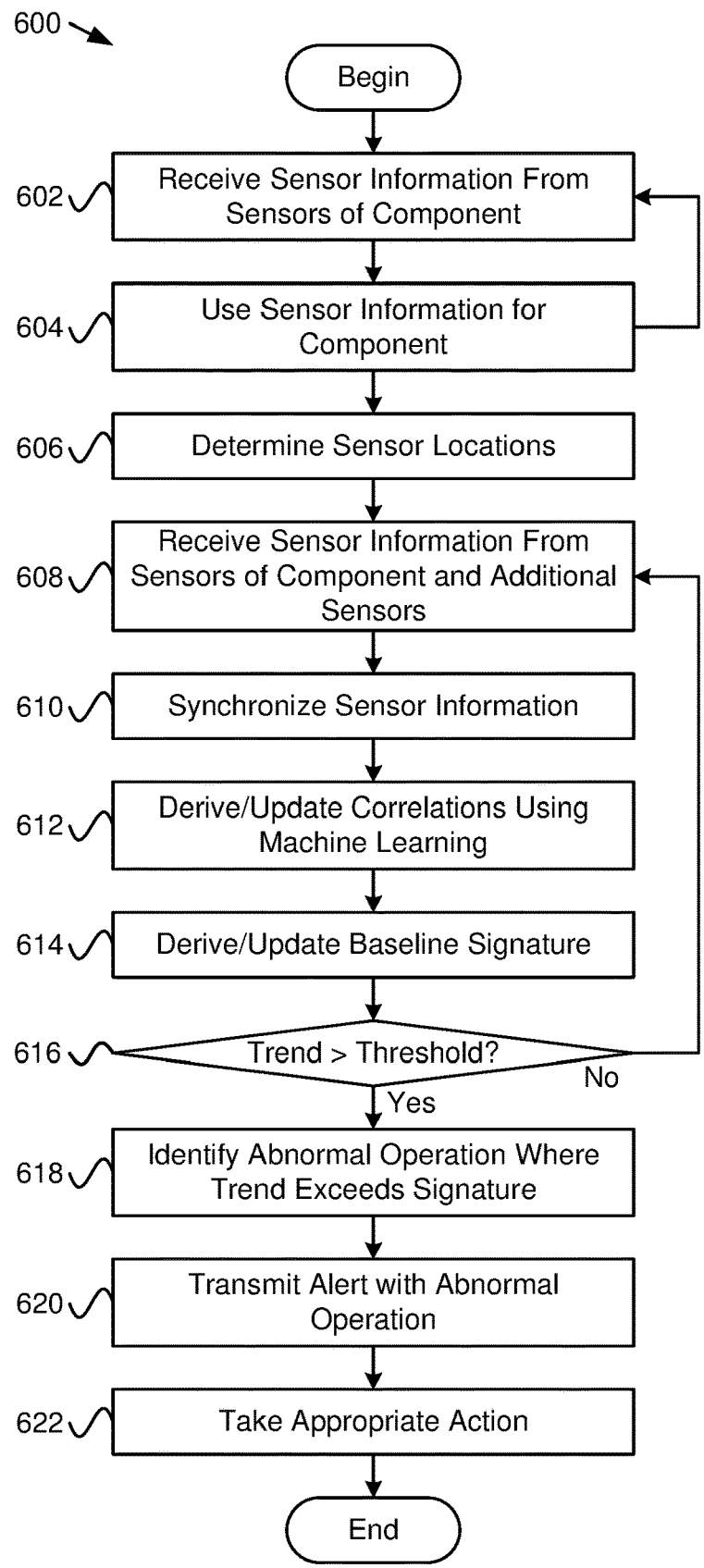
FIG. 6 is a flowchart diagram of another embodiment illustrating a method for aggregating and correlating data from different types of sensors.

FIG. 6 is a flowchart diagram of another embodiment illustrating a method 600 for aggregating and correlating data from different types of sensors. The method 600 begins and one or more components each receive 602 sensor information from one or more sensors of the component. As used herein, the one or more sensors of a first component are called component sensors and one or more sensors of another component or general-purpose sensors are additional sensors, and the component sensors and additional sensors are a plurality of sensors 150. The additional sensors may be referred to as component sensors when in a component.

The one or more components, in various embodiments, may include a machine 122, a pump 126, a drive 110, a piece of equipment 124 or other component of an industrial operation 120 in an industrial automation environment 100. In the method 600, each component uses 604 the sensor information received from the one or more sensors of the component for functionality of the component, such as for a feedback loop, for overcurrent protection, for thermal limits, or for any other process of the component. Each component receiving 602 sensor information and using 604 is a continual process, as indicated by the arrow from the using step 604 to the receiving step 602. Each component uses the sensors of the component for functionality of that component so that the functionality of the various components may be different. In some embodiments, two or more components are identical but used in different locations so sensor information used by each of the identical components is different.

The method 600 determines 606 a location of one or more of the plurality of sensors 150 and location information that includes the determined location of the sensors 150 may be referred to as sensor information along with other data from a sensor 150. The method 600 receives 608 sensor information from the plurality of sensors 150 including sensor information from the one or more component sensors and sensor information from the one or more additional sensors. The method 600 synchronizes 610 the sensor information. For example, each component may include a clock and the clocks may be synchronized. In some embodiments, the method 600 may timestamp sensor information. In other embodiments, the method 600 receives 608 sensor information and accounts for any timing difference in receiving the information before synchronizing 610 the sensor information. One of skill in the art will recognize other ways to synchronize the sensor information.

The method 600 derives 612, using the sensor information, correlations between sensor information of sensors 150 of the one or more component sensors and of the one or more additional sensors and derives 614 a baseline signature from the sensor information and the correlations. The baseline signature encompasses a range of normal operating conditions. Where the correlations and baseline signatures exist, in some embodiments, the method 600 updates 612 the correlations and updates 614 the baseline signature. The method 600 determines 616 if any trends derived from the sensor information exceed a threshold of the baseline signature. In other embodiments, the method 600 determines 616 if any trends derived from the sensor information exceed the baseline signature itself, for example, by a certain amount. If the method 600 determines 616 that a trend does not exceed a threshold and/or the baseline signature by a certain amount, the method 600 returns and receives 608 sensor information.

If the method 600 determines 616 that a trend exceeds a threshold and/or the baseline signature by a certain amount, the method 600 identifies 618 an abnormal operation based on the trend, transmits 620 an alert with the abnormal operation and takes 622 appropriate action, and the method 600 ends. The method 600 identifies an abnormal operation based on the context of the trend. For example, elevated vibrations above a threshold may indicate a start of bearing failure, an elevated temperature may indicate a loose connection, an odor above a threshold may indicate an abnormal chemical reaction, overheating, etc. Appropriate action depends on the nature of the trend. Some appropriate actions may be maintenance to replace a part. Other appropriate actions may include reducing a load, reducing production on an assembly line, etc. One of skill in the art will recognize other appropriate actions. In various embodiments, the method 600 is implemented with one or more of the sensor module 302, the correlation module 304, the baseline module 306, the error module 308, the alert module 310, the machine learning algorithm 402, the location module 404, the synchronization module 406, the command module 408, and the context module 410.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving sensor information from a plurality of sensors of an industrial operation, wherein a first portion of the sensor information is from one or more component sensors of the plurality sensors is used for functionality of a component of the industrial operation and a second portion of the sensor information is from one or more additional sensors of the plurality of sensors different from the one or more component sensors and monitor conditions of a portion of the industrial operation different from the functionality of the component, wherein the one or more component sensors provide the first portion of the sensor information to a controller of the component and the one or more additional sensors are monitored by a sensing system different than the controller;
   deriving, using the sensor information, correlations between the first portion of sensor information of sensors of the one or more component sensors and the second portion of sensor information of the one or more additional sensors, wherein deriving the correlations comprises determining whether a first sensor of the plurality of sensors and a second sensor of the plurality of sensors are related based on whether a first condition measured by the first sensor changes when a second condition measured by the second sensor changes;
   deriving a baseline signature from the sensor information and the correlations, the baseline signature encompassing a range of normal operating conditions;
   identifying an abnormal operating condition of the industrial operation based on a comparison between additional sensor information from the plurality of sensors and the baseline signature, wherein identifying the abnormal operating condition comprises determining whether a change in the first condition measured by the first sensor occurs without a corresponding change in the second condition measured by the second sensor when the correlations indicate the first sensor and the second sensor are related, wherein the first portion of the sensor information is used for the functionality of the component in addition to being used for deriving the correlations and baseline signature and identifying the abnormal operating condition and the second portion of the sensor information is not used for the functionality of the component; and
   sending an alert comprising the identified abnormal operating condition.

2. The method of claim 1, wherein the component is a first component and the second portion of the sensor information from the additional sensors is used for functionality of one or more additional components of the industrial operation.

3. The method of claim 1, wherein the one or more additional sensors are general purpose sensors independent of functionality of the component.

4. The method of claim 1, wherein identifying the abnormal operating condition comprises identifying a trend in the additional sensor information that varies from the baseline signature.

5. The method of claim 1, wherein:
   deriving the correlations from the sensor information comprises using a machine learning algorithm to derive the correlations; and/or
   identifying the abnormal operating condition of the industrial operation comprises using a machine learning algorithm to identify a trend in the additional sensor information that deviates from the baseline signature.

6. The method of claim 1, wherein deriving the baseline signature from the sensor information comprises identifying one or more contexts of the industrial operation, the one or more contexts each for different normal operating conditions in the industrial operation and wherein identifying the abnormal operating condition of the industrial operation comprises identifying additional sensor information outside of the one or more contexts.

7. The method of claim 1, wherein the baseline signature comprises one or more thresholds and identifying the abnormal operating condition of the industrial operation comprises identifying that the additional sensor information exceeds at least one of the one or more thresholds.

8. The method of claim 1, wherein the sensor information comprises location information for at least a portion of the plurality of sensors and identifying the abnormal condition comprises using the location information to identify a source of the abnormal condition.

9. The method of claim 1, further comprising synchronizing the sensor information from the plurality of sensors.

10. The method of claim 1, wherein the plurality of sensors include sensors of different types.

11. The method of claim 10, wherein the plurality of sensors sense one or more of temperature, humidity, vibration, current, voltage, motion, acoustic noise, strain, movement, odor, and pressure.

12. The method of claim 1, wherein the sensor information includes command information about operational commands issued to equipment of the industrial operation.

13. The method of claim 1, wherein the component exports sensor information from the one or more component sensors to a computing device external to the component.

14. A system comprising:
   a plurality of sensors sensing conditions on equipment of an industrial operation, wherein one or more component sensors of the plurality of sensors provide first sensor information for functionality of a component of the industrial operation and one or more additional sensors of the plurality of sensors different from the one or more component sensors provide second sensor information to monitor conditions of a portion of the industrial operation different from the functionality of the component, wherein the one or more component sensors provide the first sensor information to a controller of the component and the one or more additional sensors are monitored by a sensing system different than the controller;

a sensor module configured to receive sensor information from the plurality of sensors, the sensor information from the plurality of sensors comprising the first sensor information and the second sensor information;

a correlation module configured to derive, using the sensor information, correlations between the first sensor information of sensors of the one or more component sensors and the second sensor information of the one or more additional sensors, wherein deriving the correlations comprises determining whether a first sensor of the plurality of sensors and a second sensor of the plurality of sensors are related based on whether a first condition measured by the first sensor changes when a second condition measured by the second sensor changes;

a baseline module configured to derive a baseline signature from the sensor information and the correlations, the baseline signature encompassing a range of normal operating conditions;

an error module configured to identify an abnormal operating condition of the industrial operation based on a comparison between additional sensor information from the plurality of sensors and the baseline signature, wherein identifying the abnormal operating condition comprises determining whether a change in the first condition measured by the first sensor occurs without a corresponding change in the second condition measured by the second sensor when the correlations indicate the first sensor and the second sensor are related, wherein the first sensor information is used for the functionality of the component in addition to being used for deriving the correlations and baseline signature and identifying the abnormal operating condition and the second portion of the sensor information is not used for the functionality of the component; and an alert module configured to send an alert comprising the identified abnormal operating condition, wherein said modules comprise one or more of hardware circuits, a programmable hardware device and executable code, the executable code stored on one or more computer readable storage media.

15. The system of claim 14, wherein one or more of:
the component is a first component and the second sensor information from the additional sensors is used for functionality of one or more additional components of the industrial operation; and
the one or more additional sensors are general purpose sensors independent of functionality of the first component.

16. The system of claim 14, wherein:
the correlation module deriving the correlations from the sensor information comprises using a machine learning algorithm to derive the correlations; and/or
the error module identifying the abnormal operating condition of the industrial operation comprises using a machine learning algorithm to identify a trend in the additional sensor information that deviates from the baseline signature.

17. The system of claim 14, wherein the baseline module deriving the baseline signature from the sensor information comprises identifying one or more contexts of the industrial operation, the one or more contexts each for different normal operating conditions in the industrial operation and wherein the error module identifying the abnormal operating condition of the industrial operation comprises identifying additional sensor information outside of the one or more contexts.

18. The system of claim 14, further comprising a synchronization module configured to synchronize the sensor information from the plurality of sensors.

19. The system of claim 14, wherein the plurality of sensors sense one or more of temperature, vibration, current, voltage, motion, acoustic noise, strain, movement in a 3-dimensional space, odor, and pressure.

20. A computer program product comprising a computer readable storage medium having program code embodied therein, the program code executable by a processor to:
receive sensor information from a plurality of sensors of an industrial operation, wherein a first portion of the sensor information is from one or more component sensors of the plurality sensors is used for functionality of a component of the industrial operation and a second portion of the sensor information is from one or more additional sensors of the plurality of sensors different from the one or more component sensors and monitor conditions of a portion of the industrial operation different from the functionality of the component, wherein the one or more component sensors provide the first portion of the sensor information to a controller of the component and the one or more additional sensors are monitored by a sensing system different than the controller;

derive, using the sensor information, correlations between the first portion of the sensor information of the sensors of the one or more component sensors and the second portion of sensor information of the one or more additional sensors, wherein deriving the correlations comprises determining whether a first sensor of the plurality of sensors and a second sensor of the plurality of sensors are related based on whether a first condition measured by the first sensor changes when a second condition measured by the second sensor changes;

derive a baseline signature from the sensor information and the correlations, the baseline signature encompassing a range of normal operating conditions;

identify an abnormal operating condition of the industrial operation based on a comparison between additional sensor information from the plurality of sensors and the baseline signature, wherein identifying the abnormal operating condition comprises determining whether a change in the first condition measured by the first sensor occurs without a corresponding change in the second condition measured by the second sensor when the correlations indicate the first sensor and the second sensor are related, wherein the first portion of the sensor information is used for the functionality of the component in addition to being used for deriving the correlations and baseline signature and identifying the abnormal operating condition and the second portion of the sensor information is not used for the functionality of the component; and send an alert comprising the identified abnormal operating condition.

* * * * *